US005190185A

United States Patent [19]

Blechl

[11] Patent Number: 5,190,185

[45] Date of Patent: Mar. 2, 1993

[54] MEDICATION TRANSPORT AND DISPENSING MAGAZINE

[75] Inventor: Joseph Blechl, Ingleside, Ill.

[73] Assignee: Baxter International Inc., Deerfield, Ill.

[21] Appl. No.: 525,793

[22] Filed: May 18, 1990

[51] Int. Cl.[5] .......... B65G 59/00

[52] U.S. Cl. .......... 221/1; 221/151; 221/154; 221/176; 221/190; 221/197; 221/199; 221/287; 221/289

[58] Field of Search .......... 221/1, 151, 154, 175, 221/176, 178, 185, 186, 190, 197, 199, 289, 296, 287; 414/411, 414; 222/505, 508, 517, 328; 141/319, 320, 321, 346, 348, 349, 350, 360, 362, 364, 366

[56] References Cited

U.S. PATENT DOCUMENTS 3,998,356 12/1976 Christensen .......... 221/2
4,062,385 12/1977 Katusha et al. .......... 414/411 X
4,482,233 11/1984 Bauer et al. .......... 414/411 X
4,572,403 2/1986 Benaroya .......... 221/3
4,695,954 9/1987 Rose et al. .......... 364/413
4,785,969 11/1988 McLaughlin .......... 221/2
4,811,764 3/1989 McLaughlin .......... 141/98
4,915,571 4/1990 Toshihiko et al. .......... 414/414

*Primary Examiner*—David H. Bollinger
*Attorney, Agent, or Firm*—Paul E. Schaafsma; Amy L. H. Rockwell; Paul C. Flattery

[57] ABSTRACT

The present device is a magazine (10) which includes housing defining a medication storage area. An access door (22) is provided in the housing to gain access to stock the storage area with unit dose medication containers (34). The housing defines an open lower periphery which is covered by at least one locking mechanism having a release door (156). The locking mechanism includes a plurality of cams (166, 174, 186) cooperatively contained such that upon sequential operation, the release door (156) opens the lower periphery which allows the unit dose medication containers (34) to fall.

10 Claims, 5 Drawing Sheets

MEDICATION TRANSPORT AND DISPENSING MAGAZINE

FIELD OF THE INVENTION

The present invention relates to drug dispensing and, more particularly, to automatic controlled drug dispensing apparatus.

BACKGROUND OF THE INVENTION

The delivery of controlled substances to patients in a hospital or other medical care environment has long been the subject of attempts at improvement. Initially, the controlled substances were shipped to medical facilities packaged in containers, such as bottles, jars, and the like. These containers were stored at a central pharmacy location. When a doctor required administration of a dose of a controlled substance to a patient, a prescription was written and a nurse was responsible for obtaining the dosage from the pharmacy and administering it to the patient.

More recently, the containers of drug have been remotely located within the medical facility at stations closer to the patients receiving the medication. In this system, the pharmacy releases the containers of medicine to the various nurse substations. The containers of medicine are then stored behind locked cabinets at each nurse substation with the nurses retrieving the drug from the locked cabinet and administering the drugs to the patients.

In an effort to improve these systems, various devices have been designed for dispensing unit dose medication from an apparatus. Advances in the art have resulted in a relatively compact drug dispensing apparatus which provides a high level of security for the drugs being dispensed, is sufficiently flexible to all distribution of drugs of varying dosage formats, and reduces the labor and time drawbacks of the prior art. Because of the small size of such device, however, reloading must take place fairly often. What would be desirable would be a device which would effectuate quick, easy reloading of the dispenser while maintaining a high degree of security. The present invention fulfills these requirements.

SUMMARY OF THE INVENTION

The present device provides quick, easy reloading of a drug dispensing apparatus while maintaining a high degree of security. The present device is a magazine which includes a housing defining a medication storage area. An access door is provided in the housing to gain access to stock the storage area with unit dose medication containers. The housing defines an open lower periphery which is covered by at least one locking mechanism having a release door. The locking mechanism includes a plurality of cams cooperatively contained such that upon sequential operation, the release door opens the lower periphery which allows the unit dose medication containers to fall.

DETAILED DESCRIPTION OF A PREFERRED EMBODIMENT

Figure 1:
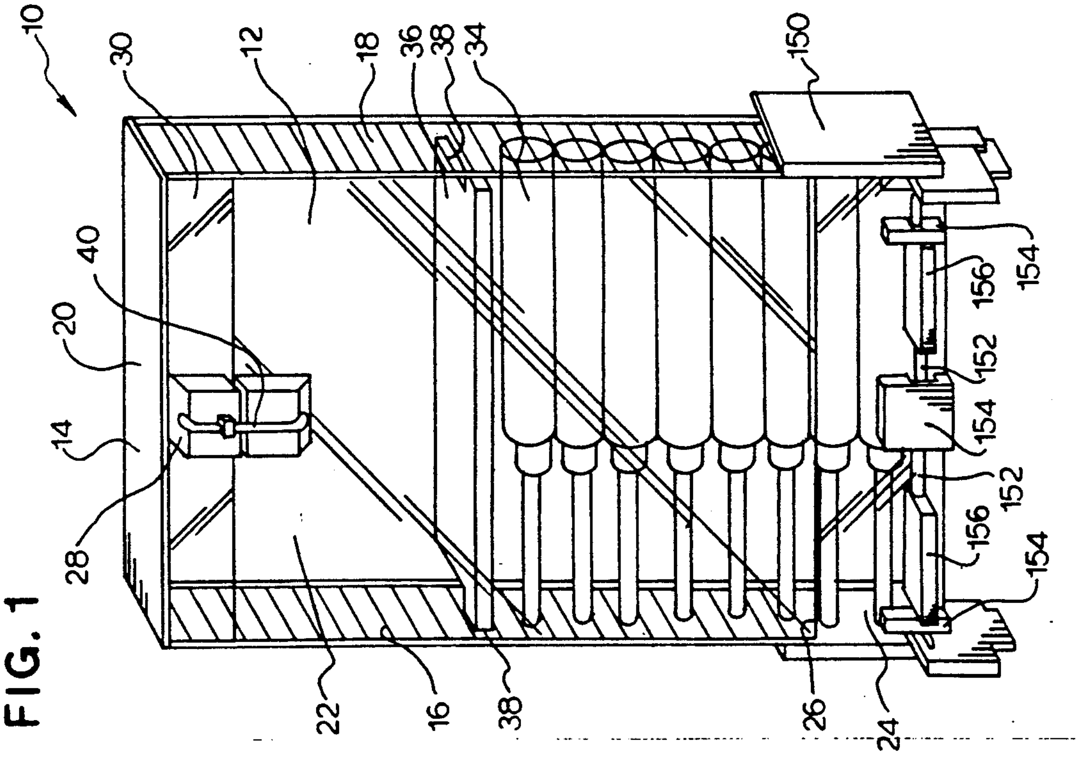
FIG. 1 is a perspective view of a device made in accordance with the principles of the present invention.

Referring first to FIG. 1, a device made in accordance with the principles of the present invention is designated generally by the reference numeral 10. For nomenclatured purposes, the present device will be referred to herein as a magazine 10.

The magazine 10 includes a front panel 12, a rear panel 14, two side panels 16, 18, and a top panel 20, thereby defining a generally rectangular box. The panels are preferably made from a clear plastic material which allows for visual inspection of the interior of the magazine 10.

The front panel 12 further defines an access door panel 22. The access door panel 22 is hingedly connected to a secured portion 24 of the front panel 12 by hinge means 26. The end of the door panel opposite the hinge means 26 is secured to a second secured position 30 of the front panel 12 by a locking latch 28.

Contained within the magazine 10 are a plurality of unit dose medication containers 34 which in the depicted embodiment are syringes. Of course, various unit dose medications 34 such as, for example, vials, oral solids, ampules, liquid cups and the like can readily be contained in the magazine 10 by altering the proportions of the magazine 10.

Also contained within the magazine 10 is an adjustable stop 36 which is contained in cooperating slots 38 provided on the interior surface of the side walls 16, 18. The interior surface of the side walls 16, 18 contain a plurality of such cooperating slots 38 such that, when the door panel 22 is open, the adjustable stop 36 can be slid into cooperating slots 38 to indicate the quantity of doses that were placed into the magazine 10 as well as prevent the unit doses from bouncing about within the magazine 10.

While the bottom of the magazine 10 is generally open, the defined opening is covered by a locking mechanism which controls the release of the unit doses from the magazine 10. The particular operations of the locking mechanism will be described in detail below.

The magazine 10 is thus utilized to store and transport unit dose medication containers 34 to locations remote from, for example, a hospital pharmacy. Such remote locations have a drug dispensing device into which the unit dose medication containers 34 are loaded to restock the dispensing device. To load the magazine, a pharmacist can open the access door panel 22 and insert the unit doses. The pharmacist can then close and lock the access door panel 22 by utilizing the locking latch mechanism 28. In the described embodiment, the locking latch mechanism 28 utilizes a cable tie 40 to secure the access door panel 22 closed.

Figure 2:
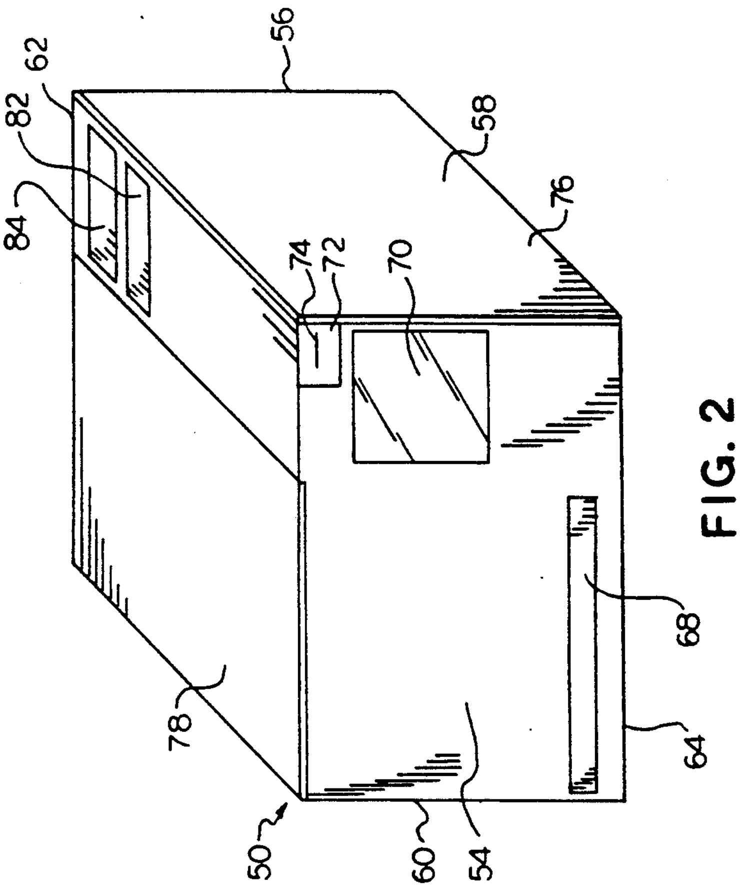
FIG. 2 is a perspective view of a drug dispensing apparatus suitable for use with the present invention.

Referring to FIG. 2, a drug dispensing device is designated generally by reference numeral 50. While the presently depicted drug dispensing apparatus 50 is particularly suited for use in conjunction with the present invention, use of suitable other dispensing apparatus is also contemplated. The drug dispensing device 50 includes housing 52 employing a generally rectangular box shape. The drug dispensing device 50 includes a front 54 and a rear 56, two sides 58, 60, and a top 62 and bottom 64. The drug dispensing device 50 is contained in a small area with the presently preferred embodiment being approximately 30 inches (76.2 cm) wide, 20 inches (50.8 cm) tall and 20 inches (50.8 cm) deep. Thus, the drug dispensing device 50 can readily be placed on a countertop at remote substations. Additionally, the drug dispensing device 50 can also be placed on a dedicated stand or wall mounted if counter space is not available.

The front of the drug dispensing device contains a locked dispensing drawer 68 which provides access to the dispensed medicines. When access is allowed, a locking latch mechanism releases and the dispensing drawer 68 can be pulled into the open position.

A user interface screen 70 which is in communication with microprocessing means (not shown) and which employs touch sensitive features known in the art is further provided on the front to allow the user to communicate with the microprocessing means. The microprocessing means can preferably be a type XT, AT or PS/2 Personal Computer manufactured by IBM Corporation Boca Raton, Fla. 33429. A card reader 72 known in the art is further provided having a slot 74 into which a magnetic user identification card is inserted or "swiped" to gain access to the microprocessing means programs. A suitable card reader 72 can preferably be a MP2A manufactured by Tokyo Tatsuno Corporation, Tokyo, Japan.

Thus, to initiate use of the drug dispensing device 50, a designated individual having access is assigned a magnetic, optical or integrated circuit identification card and a personal identification number (PIN). When the user desires to dispense medication, for example, the user initiates dispensing by inserting an identification card into the card reader 72, upon which the microprocessing means of the drug dispensing device requests the user to input a personal identification number (PIN). The user's personal identification number (PIN) is then inserted into the microprocessing means via the user interfaced touch screen 70 and, if the personal identification number (PIN) and the identification card are a match, the dispensing can proceed as will be described in more detail below. Alternatively, a finger print or retina scan device can be utilized particularly when extremely sensitive drugs are stored in the drug dispensing device 50.

One side of the drug dispensing device is provided as a maintenance door 76 which is hingedly secured to the housing and includes a locking latch mechanism to secure the door in the closed position. Thus, an individual such as a pharmacist or mechanic who is allowed access to the interior of the drug dispensing device 50 is identified through an identification card and personal identification number (PIN), the maintenance door 76 can be opened through user interface with the touch screen 70 and microprocessing means to gain access to the interior of the drug dispensing device 50 for servicing or return drug removal.

The top 62 of the drug dispensing device 50 is provided with a medication access door 78. The medication access door 78 is hingedly secured to the housing and includes a locking latch mechanism to control access. Once again, when a user designated to stock and configure the device is identified through an identification card and personal identification number (PIN), the locking mechanism releases and access to the interior of the drug dispensing device 50 can be gained. The process of restocking medication in the drug dispensing device 50 will be described in detail below.

The top 62 further includes a first ulterior door 82 which allows access to an interior storage compartment when the user desires to return medication. The first ulterior door 82 is secured by a locked latch mechanism. The first ulterior door 82 can be opened in response to a request by a user to return unused drug. When the user has logged the drug being returned, the locked latch mechanism releases the first ulterior door 82, which can then be opened, the drug is inserted, and the user then closes the first ulterior door 82 into a secure latched engagement. Because of the storage of returned drugs, the first ulterior door 82 can preferredly include a secured double walled configuration such as a trap door leading to a second service storage area which prevents subsequent access to the previously returned drugs.

Further provided on the top of the drug dispensing device is a second ulterior door 84 which allows access to a universal compartment of size and configuration sufficient to allow storage of oddly sized medications which do not fit into a dispenser 86 and cartridge 88 of the drug dispensing device 50. Once again, the second ulterior door 84 is secured by a locked latch mechanism and access to the universal compartment is achieved by a user requesting dispensing of a medication previously identified in the microprocessing means as found in the universal compartment.

Figure 4:
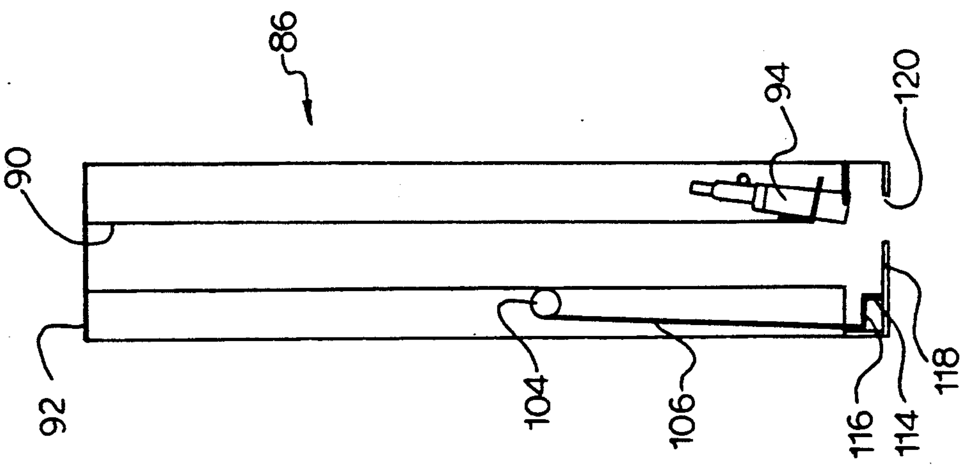
FIG. 4 is a cut-away view taken along the line IV–IV of FIG. 3.
Figure 3:
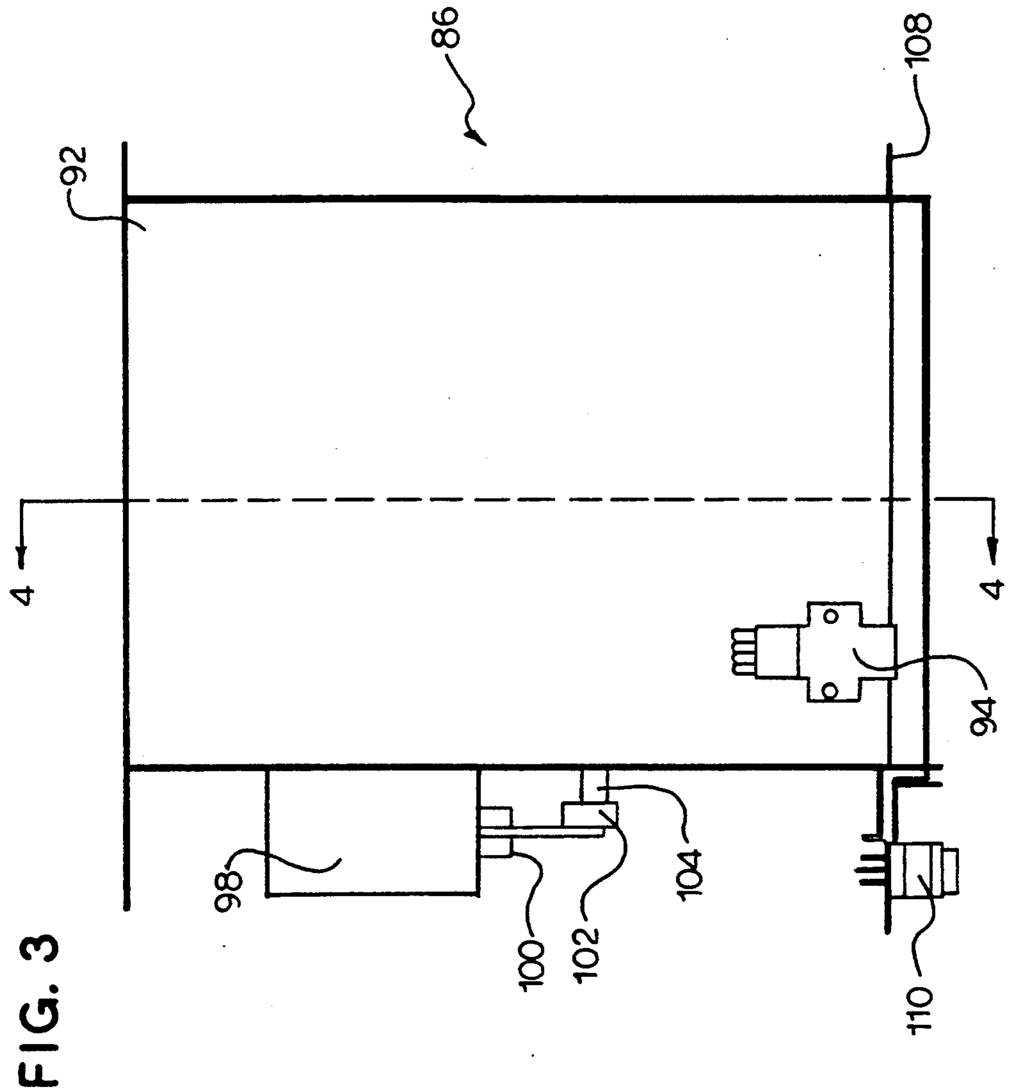
FIG. 3 is an elevational front view of a dispenser for use in the device of FIG. 2.

Referring now to FIGS. 3 and 4, a preferred embodiment of the dispenser 86 made to be inserted into the medication storage area is seen. The dispenser 86 includes dispenser housing 92 defining an interior space 90 sized to receive a cartridge 88 as will be described in detail below. An optical sensor 94 is provided on the dispenser housing to monitor the dispensing of the medication.

A solenoid 98 is provided on the exterior of the dispenser housing 92. Solenoid 98 includes a reciprocating piston 100 which is operatively connected to rotating linkage 102 which is contained on a pivot rod 104. The pivot rod 104 is rotatably journaled in the dispenser housing 92. Upon actuation, the solenoid piston 100 is retracted by the solenoid 98 whereupon the rotating linkage 102 causes rotation of pivot rod 104 and movement of an actuator arm 106 as described in detail below.

Contained offset from the bottom of the dispenser 86 is a surrounding support lip 108 which is supported in the medication storage area to support the dispenser 86. Contained on the support lip 108 and extending downward from the support lip 108 is a male electrical connector 110 which can be 8-pin quick connect type which can be cooperatively connected to a female electrical connector contained in the interior of the drug dispensing device 50. The male electrical connector 110 is electronically connected with the solenoid 98 and the optical sensor 94. Thus, as previously seen, when an electrical connection is made, power is supplied to the solenoid 98 and the optical sensor 94 and electronic communication is established between the solenoid 98, optical sensor 94 and the microprocessing means.

Referring now to FIG. 4, an elevated cut-away view of the dispenser 86 is seen. Pivot rod 104 is secured to a generally L-shaped, stepped actuator arm 106. The generally L-shaped, stepped actuator arm 106 extends downwardly from the pivot rod 104 with a stepped portion being contained near the bottom of the dispenser 50. The L-shaped stepped actuator arm defines a pushing surface 114 and a container surface 116.

The bottom of the dispenser includes a dispensing platform 118 juxtaposed relative to the interior space. The receiving platform defines an aperture 120 which extends across the entire width of the dispenser and is offset from the longitudinal axis of the interior space. The optical sensor 94 is provided located juxtaposed over the defined aperture 120.

Figure 5:
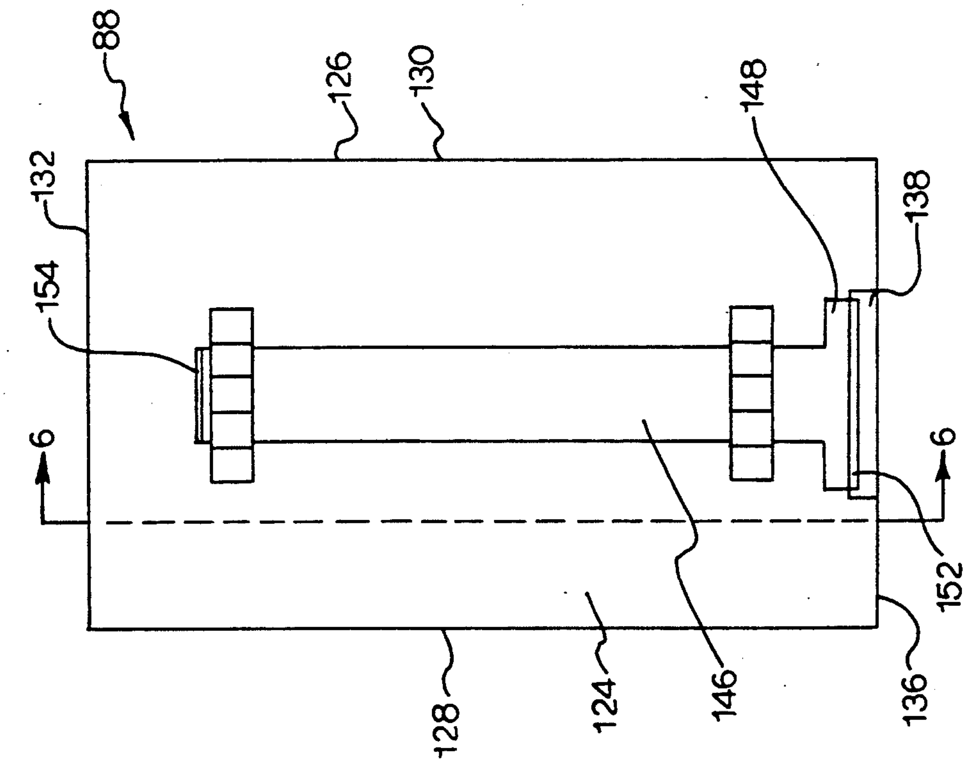
FIG. 5 is an elevational front view of a cartridge suitable for use with the dispenser of FIG. 3.

Referring now to FIG. 5, a preferred embodiment of the cartridge 88 separated from the dispenser 86 is seen. The cartridge 88 is sized to cooperatively fit into the interior space of the dispenser 86. The cartridge 88 includes front 124, back 126 and side walls 128, 130, as well as a top 132. The cartridge 88 includes an open bottom 136. On the front 124 of the cartridge 88 extending upwardly from the open bottom 136, a rectangular cut-out 138 is defined.

Thus, the cartridge 88 defines an enclosed interior storage area having an open bottom. Defined on the interior surface of the front wall 124 and back wall 126 are a plurality of inwardly projecting ribs 142. The inwardly projecting ribs 142 are oriented on a horizontal arrangement to help orient the falling medication containers which are stored and dispensed from the cartridges 88.

When the cartridge 88 is full, a plurality of stacked unit dose medication containers 34 are contained in the interior storage space. While the embodiment depicted herein contains syringes, it will be appreciated that various medication containers such as for example, oral solids, ampules, liquid cups, and the like, can readily be contained in dedicated cartridges by altering the proportions of the cartridge and dispenser.

The medication containers 34 can initially be prevented from falling out the open bottom by means of a retaining member 146. The retaining member 146 defines an upper and lower periphery and is generally an inverted T-shape with an expanded width area 148 found at the lower periphery. The expanded width area 148 corresponds in size to the rectangular cut-out 138 defined on the front 124 of the cartridge 88.

The expanded width area 148 includes at its lower periphery an L-shaped portion 152 which extends into the rectangular cut-out 138. Thus, the medication containers 34 abut against the L-shaped portion 152 which acts to contain the medication containers 34 within the interior storage area.

The upper periphery of the retaining member 146 includes an outwardly extending flange 154 to enable the user to grip and pull the retaining member 146. The retaining member is secured to the front of the cartridge 88 by a pair of adhesives securing the retaining member 146 near its upper and lower periphery.

The cartridge 88 can preferably be made from a rigid metal such as aluminum or stainless steel. The retaining member 146 can preferably be made of a semi-rigid thin material such as spring steel which is sufficiently rigid to prevent access to the medication containers.

Figure 6:
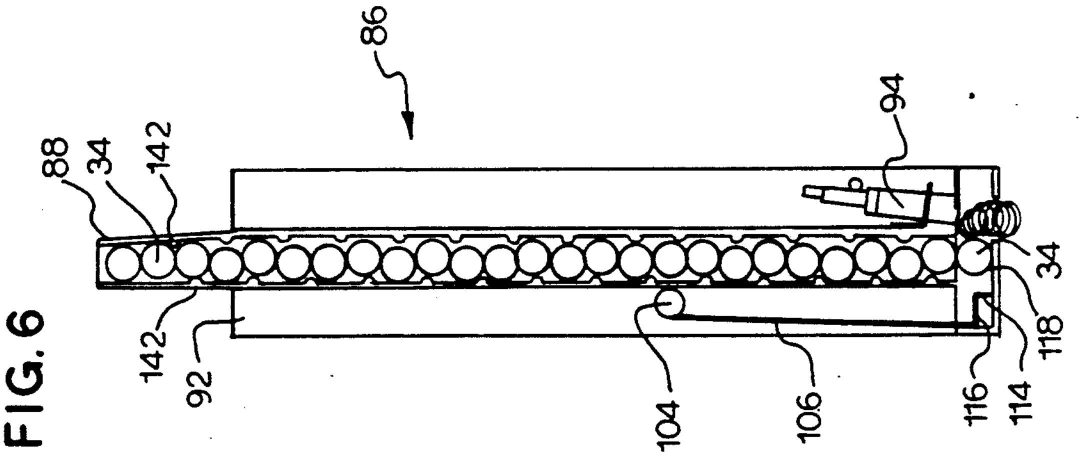
FIG. 6 is a cross sectional cut-away view showing the cartridge of FIG. 5 in the dispenser of FIGS. 3 and 4.

Referring now to FIG. 6, an elevational cross sectional view similar to that seen in FIG. 4 with a cartridge 88 fit into a dispenser 86 is seen. In this stage, the retaining member 146 has been removed to allow free fall of the medication containers 34 out of the cartridge 88. Upon actuation of the solenoid 98 and resultant pivot of the pivot rod 104, the stepped actuator arm 106 rotates counter-clockwise with the pushing surface 118 contacting the medication container 34 resting on the dispensing platform 118 and urging the medication container 34 towards the aperture 120. When the medication container 34 is urged to a position over the aperture 120, gravity induces it to fall, which passage is sensed by the juxtaposed sensor 94 and relayed to the microprocessing means.

When the medication container 34 is urged from the dispensing platform 118, gravity pulls the remaining medication containers 34 toward the dispensing platform 118. While the stepped actuator arm 106 is maintained by the solenoid 98 in a counter-clockwise position, the remaining medication containers 34 fall against the containing surface 116 of the stepped actuator arm 106 which prevents additional medication containers 34 from dispensing. Upon rotation of the stepped actuator arm 106 in a clockwise direction to its original position, the medication containers 34 free fall and rest against the dispensing platform 118 in position for the next dispensing. The dispensed medication container 34 free falls into the drawer 68 for access by the user.

Referring now back to FIG. 1 in conjunction with FIGS. 7–9, the operation of the locking mechanism of the magazine 10 will be described in detail. At the lower periphery of the side members 16, 18 of the magazine 10, an end panel 150 is secured to each side panel 16, 18. The end panel 150 acts as housing for the actuating members of the locking mechanism.

Contained on the lower periphery of the front panel 12, on the secured portion 24 of the front panel, are a series of support blocks 154 through which a pivot rod 152 is journaled. The support blocks 154 include a main support block found generally at the center and a pair of periphery support blocks found near the sides of the secured panel 24.

Contained secured to the pivot rod 152 and extending inwardly under the interior space of the magazine 10 are a pair of release doors 156. While the release doors 156 can be contained on a single pivot rod 152, preferably a pair of separate pivot rods 152 are provided, one each for each release door 156 for security reasons as will be explained in detail below.

Contained secured to the cartridge 88 is a cooperating engaging member 158 which consists of a pair of rigid support bars 160, 162. Contained on the magazine 10 in cooperating juxtaposed relationship with one of the rigid support bars 162 is a link actuator cam 166. The link actuator cam 166 includes at its lower periphery a generally step interface 168 while at its upper periphery contains an angled edge 170 which acts in cooperating relationship with a lock member cam 172.

Housing 174 is provided contained on the underside of the link actuator cam 166 and lock member cam 172 which defines a guide aperture 176. A link pin 178 secured to the link actuator cam 166 extends into the guide aperture 176. The guide aperture 176 is oriented generally vertically which results in the link actuator cam 166 being movable only in a generally vertical direction.

The lock member cam 172 contains at its lower periphery an angled cooperating side 182 which cooperates with the link actuator cam angled upper side 170. Also contained on the lower periphery of the lock member cam 172 is a stepped locking segment 184 which acts in cooperating locking relationship with a main cam 186. Once again, the housing 174 defines a generally horizontal guide aperture 190 for the lock member cam 172 through which extends a lock member guide pin 192. Thus, movement of the lock member cam 172 is generally limited to the horizontal orientation.

Additionally provided is a biasing member 194 which acts to urge the lock member cam 172 into a locking orientation with the main cam 186. In the preferred embodiment, this biasing member 194 is a lock torsion spring which extends from the lock member guide pin 192 to a secured spring anchor 196 contained on the end panel 150. Also contained on the end panel 150 is a biasing member stop pin 198. Thus, at rest, the lock member cam 172 is urged into a locking relationship with the main cam 186 which also results in urging the link actuator cam 166 downward.

Contained in cooperating relationship with the stepped locking segment 184 of the lock member cam 172 is the main cam 186. The main cam 186 also includes as its lower periphery a stepped interface 200 which acts cooperatively with the second rigid bar 160. The stepped interface 200 of the main cam 186 is larger than the stepped interface 168 of the link actuator cam 166 which results in actuation of the link actuator cam 166 by the engaging member 158 prior to actuation of the main cam 186.

The housing 174 again defines a vertically oriented guide aperture 202 which, for the main cam 186, is longer than the guide aperture 176 for the link actuator cam 166. Extending through the main cam guide aperture 202 are a pair of spaced cam guide pins 204. Thus, the use of a pair of spaced cam guide pins 204 results in the main cam 186 being limited to a vertical movement. Additionally, one side of the main cam 186 abuts against a side of the link actuator cam 166 which further acts to guide the link actuator cam 166 in a vertical orientation.

Figure 8:
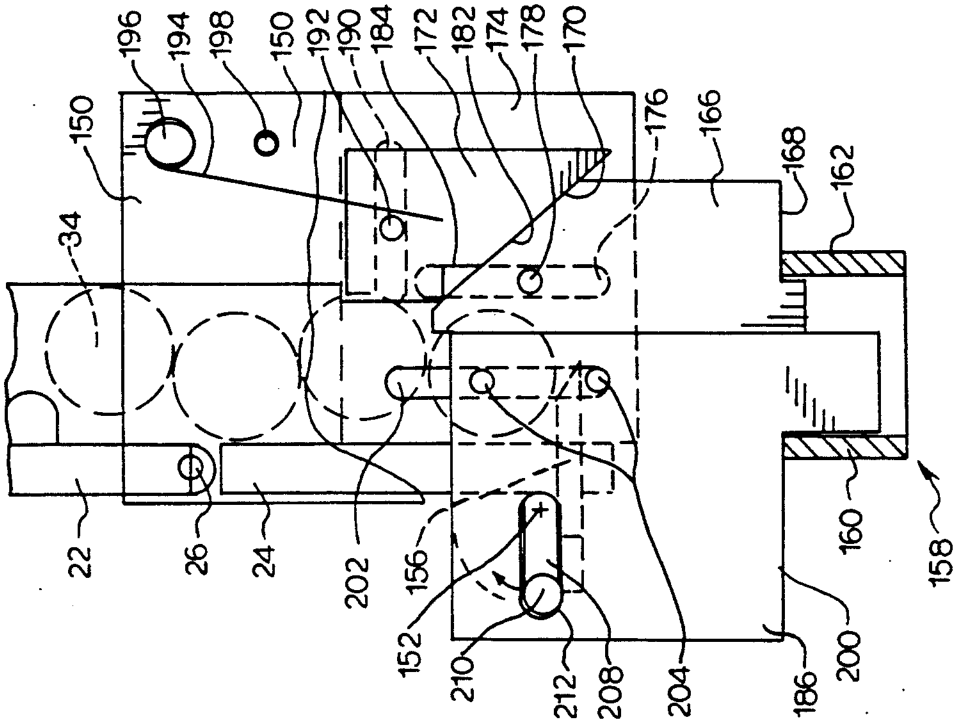
FIGS. 7–9 are elevated, detailed views of the bottom of the device of FIG. 1.
Figure 7:
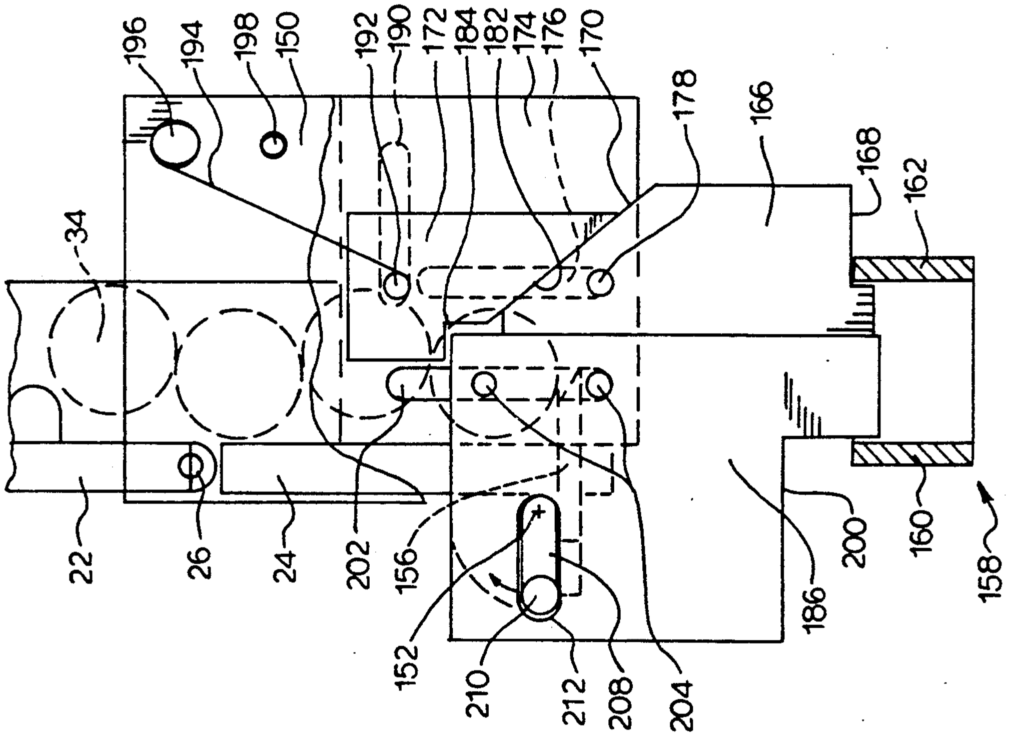
Figure 9:
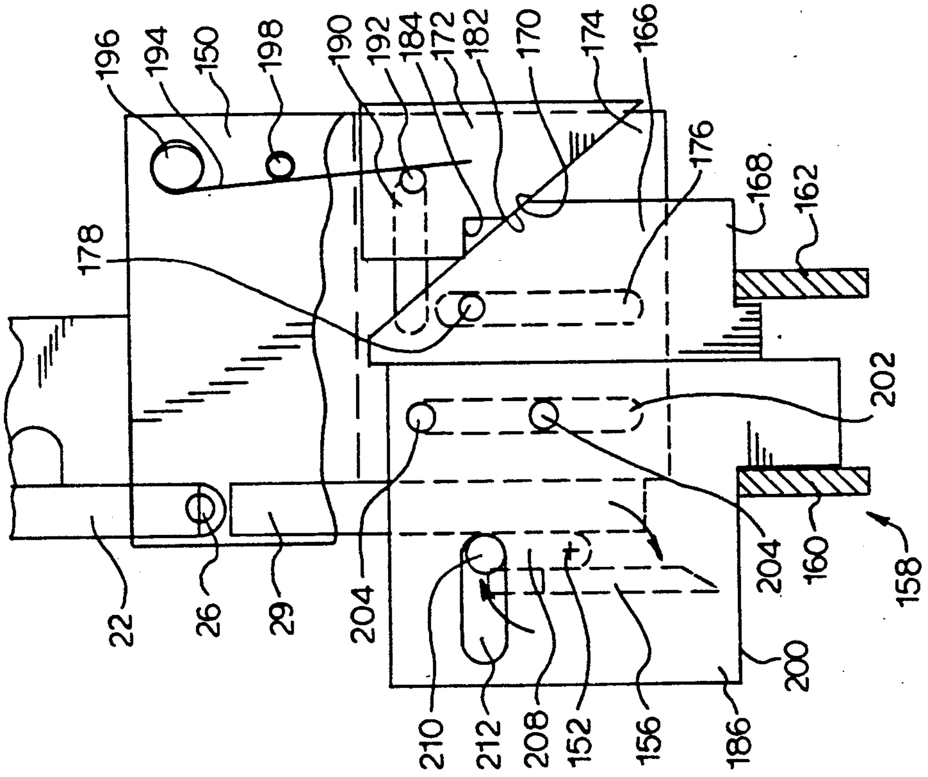

As best seen in FIGS. 7 and 8, the release doors 156 are contained at rest oriented into the interior of the magazine 10 which secures the unit drug doses 34 into the interior of the magazine 10. The release door 156 is secured to a door pivot section 208 through which the pivot rod 152 extends. The door pivot section 208 includes an outwardly extending guide pin 210 which extends through a horizontally aligned aperture 212 defined in the main cam 186.

To release the locking mechanism to dispense the unit doses 34 found in the interior of the magazine 10, the magazine 10 is aligned juxtaposed above the cartridge 88 such that upon actuation the unit doses 34 will fall via gravity into the cartridge 88. The link actuator cam 166 and main cam 186 are aligned over the respective engaging members 162, 160 and pressure is applied downwardly. Because as previously seen, the stepped interface 168 of the link actuator cam 166 contacts the engaging member 158 prior to the stepped interface 200 of the main cam 186, the engaging member 158 initially acts to urge the link actuator cam 166 upward. This results in the link actuator cam upper periphery 170 cooperatively acting with the lock member cam lower periphery 182 to urge the lock member cam 172 horizontally against the biasing member 194.

When the link actuator cam 166 has urged the lock member cam 172 sufficiently horizontally such that the stepped locking segment 184 of the lower periphery 182 of the lock member cam 172 has been urged out of alignment with the main cam 186, the lower interface 200 of the main cam 186 contacts the engaging member 158. This is seen particularly in FIG. 8. With the main cam 186 now freely able to move vertically, pressure on the lower interface 200 results in the outwardly extending guide pin 210 being urged to rotate about the axis of the pivot rod 152. This rotation results in the rotation of the inwardly extending release door 156 out of the interior of the magazine 10 which allows the unit doses 34 to freely fall via gravity into the cartridge 88. This can be seen particularly in FIG. 9.

Figure 10:
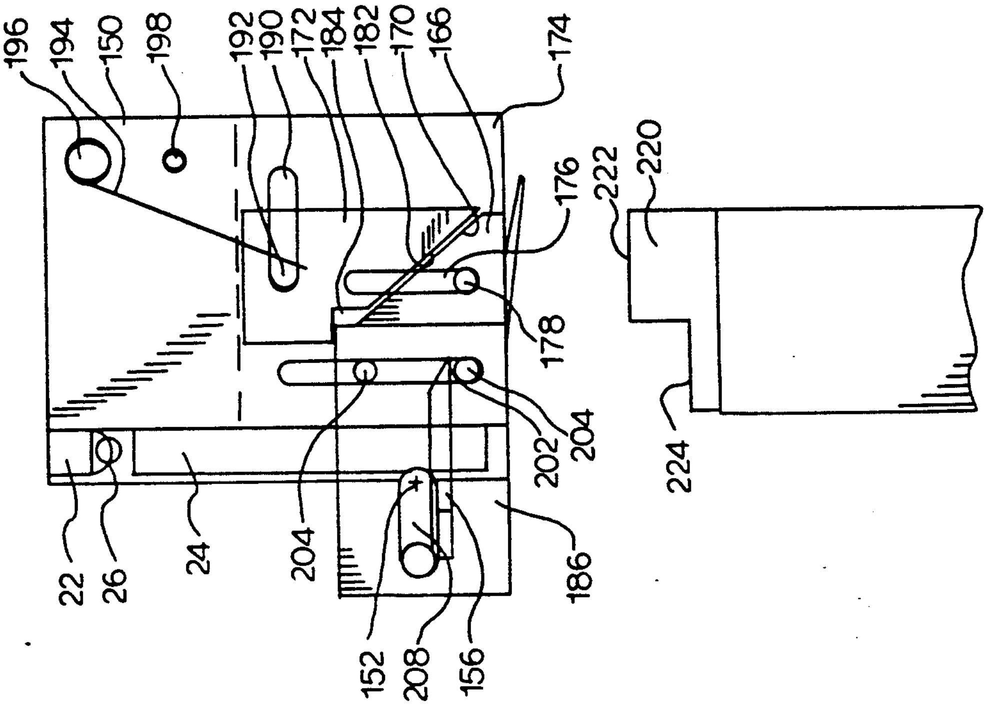
FIG. 10 is an elevated, detailed view of the bottom of an alternative embodiment of the present invention.

Referring now to FIG. 10, an alternative preferred embodiment of the present device is seen in schematic form. This alternative preferred embodiment provides for additional security by providing an engaging member 220 having stepped segments 222, 224 which results in the members of the locking mechanism being contained entirely within the magazine end panel 150. Thus, in this preferred second embodiment, it becomes even more difficult to gain access to the interior of the magazine 10 as none of the actuator members are accessible outside the housing. The locking mechanism of this embodiment performs in the same manner upon actuation.

Because the present device releasing means utilizes a particular sequence of movements to gain access to the interior of the magazine 10 which is created by particular interface with the cartridge 88, the chance of errors or diversion of the unit doses 34 found within the magazine 10 is decreased. Additionally, because the present device utilizes a pair of separately operable locking mechanisms, the sequential operation is even more difficult to recreate without use of the particular interface. Finally, use of an access door 22 to gain access to the interior of the magazine 10 allows for easy loading of the magazine 10 by an authorized person while the locking mechanism 28 prevents unauthorized people from gaining access to the interior of the magazine.

It should be understood that various changes and modifications to the preferred embodiments described herein will be apparent to those skilled in the art. Such changes and modifications can be made without departing from the spirit and scope of the present invention without diminishing its attendant advantages. It is, therefore, intended that such changes and modifications be covered by the appended claims.

What is claimed is:

1. A magazine for storing and dispensing unit dose medication containers comprising:

housing defining a medication storage area, the housing further defining an aperture at the lower periphery of the storage area and a second aperture near the upper periphery of the storage area;

an access door contained on the housing covering the second aperture which opens to gain access to the storage area;

a release door extending over the lower aperture;

a cam member contained in cooperative association with the release door such that upon actuation of the cam member, the release door opens the lower aperture; and a locking mechanism having a rest position in which operation of the cam member is prevented and an operative position in which operation of the cam member is allowed;

such that only after the locking member is in the operative position can the cam member be actuated to open the lower aperture.

2. The magazine of claim 1 further including a second release door extending over the lower aperture, a second cam member contained in cooperative association with the second release door such that upon actuation of the second cam member, the second release door opens, and a second locking mechanism having a rest position in which operation of the second cam member is prevented and an operative position in which operation of the second cam member is allowed.

3. The magazine of claim 1 wherein the locking mechanism includes a link actuator cam which in a rest position obstructs the operation of the cam member such that the link actuator cam must be sequentially operated first to release the cam member the cam member being operated last to open the release door.

4. The magazine of claim 3 wherein the locking mechanism further includes a lock cam which locks the cam member such that the link actuator cam must disable the lock cam to release the locked cam member.

5. The magazine of claim 3 wherein the link actuator cam includes a stepped lower periphery which controls the operation of the link actuator cam and the cam member includes a stepped lower periphery which controls the operation of the cam member, the link cam stepped portion extending a distance further than the cam member stepped portion such that sequential operation of the link cam and the cam member is effectuated.

6. The magazine of claim 5 wherein the stepped lower periphery of the link actuator cam extends lower than the stepped lower periphery of the main cam.

7. The magazine of claim 3 further wherein the sequential operation of the cams is caused by a stepped engaging member which contacts and therefor causing operation of the link actuator cam prior to contacting and causing operation of the cam member.

8. A method for stocking unit dose medication containers comprising:

placing a plurality of medication containers in a magazine having a storage area for holding the medication containers, an access door for accessing the storage area, and a locking mechanism for containing the medication containers in the storage area; storing the medication containers in the magazine; transporting the magazine to the site of actual use; and loading the medication dispensers into an automatic dispensing apparatus by releasing the locking mechanism to allow a cam member to actuate a release door to allow the medication dispensers to fall by gravity into a cartridge contained in the automatic dispensing apparatus.

9. The method of claim 8 wherein the step of loading the medication dispensers into an automatic dispensing apparatus further includes the steps of:

activating a link actuator cam to unlock the cam member; and activating the can member to release the medication dispensers.

10. The method of claim 9 further wherein activation of the link actuator cam deactivates a lock member cam which unlocks the cam member.

* * * * *